March 18, 1958     D. S. HALL ET AL     2,827,125
APPARATUS AND METHOD FOR QUENCHING PYROLYSIS PRODUCTS
Filed Dec. 17, 1953
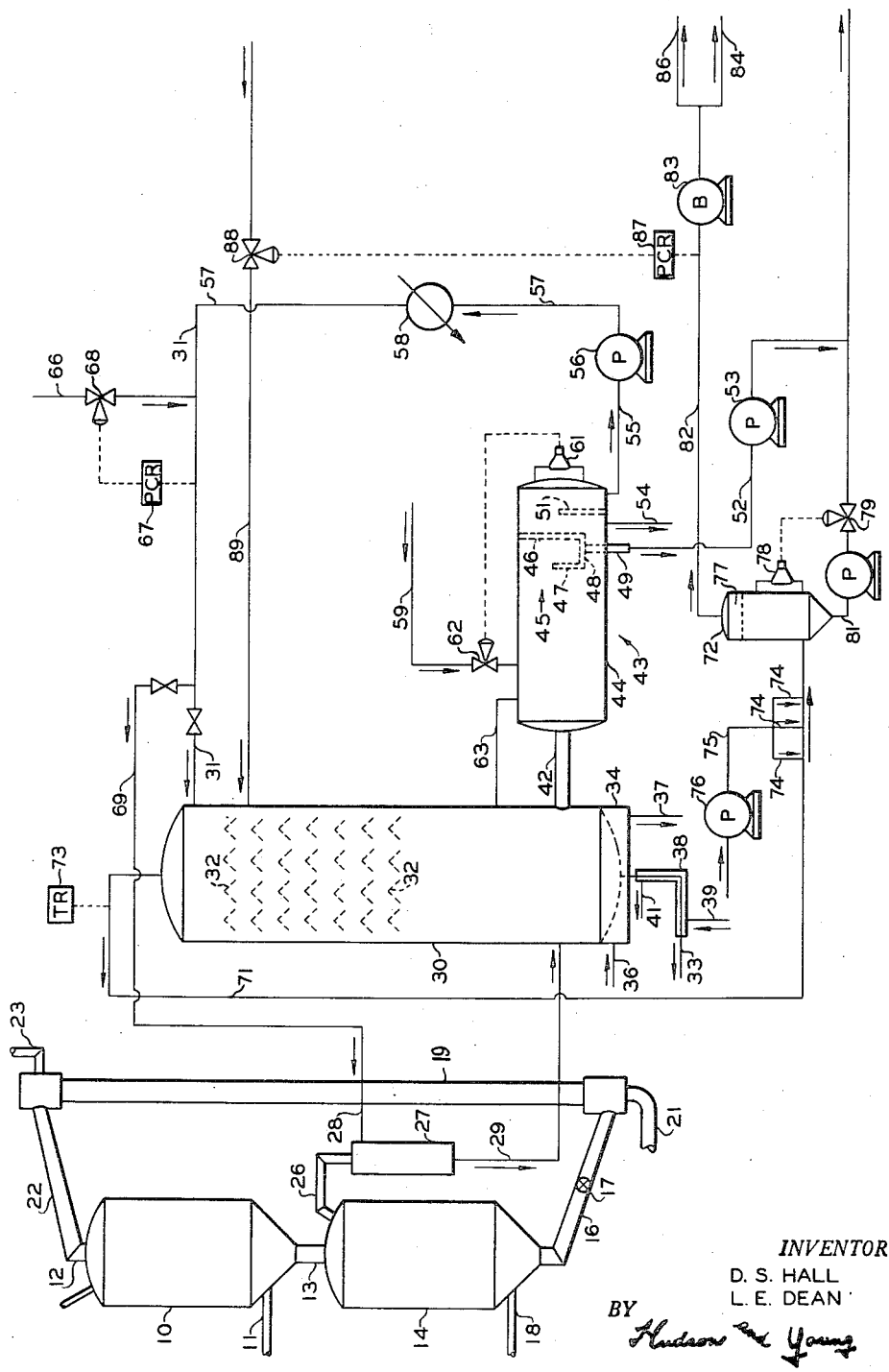
INVENTORS.
D. S. HALL
L. E. DEAN
BY
ATTORNEYS

United States Patent Office 2,827,125
Patented Mar. 18, 1958

2,827,125

APPARATUS AND METHOD FOR QUENCHING PYROLYSIS PRODUCTS

Dick S. Hall, Phillips, Tex., and Lloyd E. Dean, Bartlesville, Okla., assignors to Phillips Petroleum Company, a corporation of Delaware Application December 17, 1953, Serial No. 398,744

11 Claims. (Cl. 183—2)

This invention relates to hydrocarbon conversion. In one of its more specific aspects, it relates to the purification of gases recovered from the thermal conversion of hydrocarbons. In another of its more specific aspects, it relates to the quenching of cracked gases and the removal of tar therefrom. In still another of its more specific aspects, it relates to a quench and tar removal system employed for use with pebble heaters in the thermal conversion of hydrocarbons. In yet another of its more specific aspects, it relates to a method of cooling and scrubbing cracked hydrocarbon gas.

In carrying out thermal conversion processes in pebble heater apparatus, a gravitating mass of solid heat exchange material heated to a high temperature by passing hot gas therethrough in a first direct heat exchange step is thereafter caused to contact gaseous reactant materials in a second direct heat exchange. The conventional pebble heater apparatus generally comprises a pebble heating chamber and a gas reaction chamber which may be disposed in substantially vertical alignment. The solid heat exchange material is introduced into the upper portion of the pebble heating chamber where the material forms a bed of heat exchange material which flows downwardly through the chamber in direct heat exchange with hot gaseous heat exchange material. In the heat exchange, the solid heat exchange material is heated to a high temperature and is then passed to the gas reaction chamber in which the hot solid heat exchange material is caused to contact gaseous reactant materials in a second direct heat exchange relation furnishing heat for the treatment or conversion of the gaseous materials. The solid heat exchange material, cooled as a result of the second heat exchange, emerges from the bottom of the second chamber and flows downwardly to the lower part of an elevator which elevates the material to the upper portion of the pebble heating chamber.

Solid heat exchange material which is conventionally used in pebble heater apparatus is generally called "pebbles." For a more complete description of the pebbles which can be utilized, reference may be had to U. S. Patent No. 2,536,436.

Thermal conversion processes carried out in pebble heater apparatus are conducted at relatively high temperatures. In general, pebbles in the upper chamber are heated to temperatures in the approximate range of 1400° F. to 3200° F. depending upon the particular process. Ordinarily, pebble inlet temperatures in the lower chamber are about 100° F. to 500° F. below the average combustion gas temperature within the pebble heating chamber. For example, in processes for the production of ethylene from light hydrocarbons, such as ethane or propane, the pebble temperature in the gas reaction chamber is usually in the range of 1200° F. to 1800° F. In the production of acetylene by pyrolysis of hydrocarbons, temperatures in the range of 1800° F. to 3000° F. are desirable. Because of the high temperatures of the cracking reaction involved in such processes, it becomes necessary to rapidly quench the effluent to a temperature at which the cracked gas is stable in order to stop the reaction and prevent polymerization. The hydrocarbon cracking reaction is also accompanied by the formation of tar which is carried out of the reaction chamber with the cracked gas. Because of the operational difficulties which arise as a result of tar deposits in valves, pipes, blowers, etc., it is necessary to remove the tar from the cracked gas as soon as possible after removal from the reaction chamber. In accordance with this invention, a quench system is provided which rapidly cools the cracked gas to a temperature at which it is stable and removes the tar therefrom, thereby assuring continued and efficient operation of the hydrocarbon conversion system.

The objects of this invention will be attained by the various aspects of the invention.

It is an object of the present invention to provide means for quenching and purifying cracked gases recovered from hydrocarbon conversion processes.

Another object of the present invention is to provide a quench and tar removal system for use in conjunction with pebble heater apparatus.

Still another object is to provide a method for rapidly quenching a cracked gas and for removing the tar therefrom.

A still further object is to provide a quench and tar removal system in which a cracked gas is contacted separately and successively with water and oil in order to effect the desired cooling of the cracked gas and tar removal therefrom.

Yet another object is to provide a separation means wherein water is recovered for recycling to a quenching zone and which has associated therewith a control means whereby the amount of water required for quenching is regulated.

Various other objects, advantages and features of the invention will become apparent from the accompanying disclosure.

Broadly speaking, the present invention involves contacting a cracked gas, which may have been subjected to a preliminary cooling, with water in a quenching zone in order to cool the gas and remove therefrom a substantial amount of the tar contained therein. The cooled, partially tar-free gas is then contacted with oil and thereafter passed into a gas separation zone, thereby removing by scrubbing and absorption any traces of tar which may still remain in the gas after the initial quenching step.

In a more specific aspect of the present invention, a cracked gas recovered from a reaction zone is passed into a first quenching zone where the gas is contacted with a heat exchange liquid, such as water, thereby cooling the gas to the temperature at which the gas is relatively stable. The cooled gas is thereafter passed into a second quenching zone where it is contacted with a heat exchange liquid, such as water, in countercurrent flow. The gas is thus further cooled, and tar is partially removed therefrom by the scrubbing action of the water. The partially tar-free gas recovered from the second quenching zone is thereafter subjected to further scrubbing by contacting same with a predominantly aromatic oil and then passed into a gas separation zone where the remaining tar is separated from the gas. A liquid mixture comprising water, light oil, and tar is withdrawn from the lower portion of the second quenching zone and introduced into a phase separation zone where the liquid mixture separates into layers of water, light oil, and tar. Water from the phase separation zone is recycled to the second quenching zone, and control means are provided whereby the amount of water recycled is regulated.

Water acts as an effective medium for cooling the cracked gas and removing the tar therefrom, but only partial removal of the tar is obtained by water quenching. By contacting the partially tar-free gas with oil subsequent to the water quenching step, any remaining tar which may be contained therein is removed by absorption and scrubbing. It has been found that oils which are predominantly aromatic are good solvents for tars and are, therefore, very effective in removing the final traces of tar from the cracked gas. Oils which are preferably employed include benzene, toluene, anthracene, predominantly aromatic kerosenes having, for example, a boiling point in the range of 200° F. to 500° F., and predominantly aromatic gas oil, such as a gas oil recycled in a cracking system and having a boiling range of 400° F. to 700° F.

A more complete understanding of the invention may be obtained by reference to the following description and drawing which is a diagrammatic flow diagram of the quench and tar removal system of this invention as employed with pebble heater apparatus.

Referring to the drawing, pebbles are heated in pebble heater chamber 10 by contact with hot gaseous heat exchange material introduced into the chamber through gaseous material inlet 11. Pebbles are introduced into the pebble heating chamber through pebble inlet conduit 12 and form a contiguous gravitating mass which extends downwardly through chamber 10, pebble conduit 13, gas reaction chamber 14, and pebble outlet conduit 16 to pebble feeder 17. The pebbles are heated in pebble heating chamber 10 to temperatures generally in the approximate range of 1400° F. to 3200° F., and thereafter the hot pebbles are gravitated through conduit 13 into the upper portion of a gas reaction chamber 14. Usually pebble inlet temperatures in chamber 14 are about 100° F. to 500° F. below the average combustion gas temperature within the heating chamber. Gaseous reactant materials introduced into the reaction chamber through inlet conduit 18 contact the gravitating mass of hot pebbles and undergo reaction. The cooled pebbles flow from the bottom of the reaction chamber through pebble outlet conduit 16 and pass therethrough into the lower end of elevator 19 at a rate dependent upon the operation of pebble feeder 17. In the lower end of elevator 19, the pebbles contact a stream of lift gas which is introduced into the elevator through lift gas inlet conduit 21. The pebbles are raised by the lift gas stream to the top of the elevator where the pebbles fall out of the stream and pass down pebble conduit 22 into the upper portion of chamber 10 through pebble inlet conduit 12. The lift gas is withdrawn from the top of elevator 19 though gaseous effluent conduit 23.

The cracked gas is withdrawn from the upper portion of gas reaction chamber 14 through gaseous effluent outlet conduit 26 and is passed immediately to preliminary quench chamber 27. A heat exchange liquid, such as water, introduced into the upper portion of quench chamber 27 through line 28 passes with the cracked gas downwardly through the chamber in concurrent flow. The cracked gas is thereby cooled to a temperature at which it is stable, for example, to a temperature in the approximate range of 500° F. to 1000° F. While it is preferred to utilize the preliminary quenching chamber as illustrated in order to rapidly stop the reaction and prevent polymerization, it is within the contemplation of the invention to omit this chamber and pass the cracked gas directly into the gas-liquid contact tower to be described hereinafter.

The cooled gas, along with steam and water, is withdrawn from preliminary quench chamber 27 through line 29 and introduced into the lower portion of gas-liquid contact tower 30. The gas flows upwardly through the tower where it is contacted in countercurrent flow with a heat exchange liquid, such as water, introduced into the upper part of the tower through line 31 which is connected to a horizontal manifold of downwardly pointing sprays, not shown. Intimate contact between gas and water is facilitated by providing contacting decks or baffle members 32 in the upper portion of the tower. As illustrated, the baffle members are angle irons, but it is to be understood that other forms of construction can be utilized without departing from the spirit or scope of the invention. The water in contacting the cracked gas cools it to a temperature in the range of about 100° F. to 150° F. and partially removes the tar therefrom by subjecting it to a scrubbing action. Tar collects in the bottom part of tower 30 and is removed therefrom through line 33. In order to prevent solidification of the tar, the lower portion of the tower is surrounded by a steam jacket 34 provided with steam inlet and outlet lines 36 and 37, respectively. Line 33 is also provided with a steam jacket 38 having steam inlet and outlet lines 39 and 41 affixed thereto. By circulating steam through steam jackets 34 and 38, the tar is maintained in a liquid state, thereby facilitating removal of the same from tower 30.

A mixture of water, light oil, and tar is withdrawn from the lower portion of gas-liquid contact tower 30 through conduit 42 and passed into phase separator or settler 43. Separator 43 comprises a substantially horizontal tank 44, having an oil collecting means 45 disposed therein. The oil collecting means comprises two substantially vertical wall members 46 and 47 connected by a horizontal bottom member 48 having an oil withdrawal means 49 affixed thereto. Wall member 46 extends upwardly from bottom member 48 to the top of tank 44 while wall member 47 extends upwardly from bottom member 48 to a level below the top of the tank. A gas passage, not shown, is provided in the upper part of wall member 46 in order to keep the pressure equalized on either side of the oil collecting means. Substantially vertical baffle member 51 is attached to the bottom of tank 44 between tar withdrawal line 54 and water withdrawal line 55. In separator 43 the mixture separates into an upper layer of light oil, an intermediate layer of water, and a lower layer of tar. The oil collects in oil collecting means 45 and is removed therefrom by line 52 connected to oil withdrawal means 49 and provided with a pump 53. Tar, which collects in the bottom of the separator, is removed therefrom through line 54. Water is removed from the separator through line 55 and through the action of pump 56 is recycled through lines 57 and 31 to the upper portion of gas-liquid contact tower 30. Prior to introduction into tower 30, the water is passed through cooler 58 where the water is cooled to a temperature suitable for the quenching step. Additional water required for the operation of the quench system is supplied to separator 43 through line 59. Separator 43 is provided with a liquid level controller 61 which is operatively connected to valve 62 in line 59, thereby providing means for automatically maintaining a predetermined liquid level in the separator. In this manner, the amount of water required for the quench system is continuously and automatically maintained. Line 63 communicates gas-liquid contact tower 30 with separator 43, thereby equalizing the pressures within the tower and the separator.

Water inlet line 31 has an emergency water line 66 connected thereto. A pressure controller recorder 67, which indicates the water pressure in line 31, is operatively connected to valve 68 in line 66 and is set to open valve 68 when the water pressure in line 31 falls below a predetermined level. Water for preliminary quench chamber 27 is taken from line 31 through line 69 which in turn leads to line 28.

Partially tar-free cracked gas is taken overhead from gas-liquid contact tower 30 through conduit 71 and passed to gas separator 72. Line 71 is provided with a temperature recorder 73 which is set to give an audible-visible alarm if the effluent temperature rises above a set point. In this manner, the hydrocarbon blower, to be mentioned hereinafter, is protected from being overheated. Prior to the introduction of the cracked gas into gas separator 72, the gas is sprayed or contacted with a predominantly aromatic oil introduced into conduit 71 through spraying means 74 which are connected to oil line 75 containing pump 76. Any remaining tar still contained in the cracked gas is removed therefrom by absorption and scrubbing. The gas and oil with tar dissolved therein enter separator 72, the gas passing upwardly through the separator while the oil containing tar collects in the lower portion of the separator. A wire coil, pad type mist extractor 77 located near the top of separator 72 serves to separate from the gas any entrained oil and tar. A liquid level controller 78 provided on the lower side of separator 72 is operatively connected to valve 79 in oil outlet line 81 containing a pump in order to maintain a predetermined oil level in the separator. Oil and tar are withdrawn from the separator through line 81 in amounts sufficient to maintain the desired oil level in the separator. Purified, tar-free cracked gas is taken overhead from separator 72 through line 82. Hydrocarbon blower 83, which takes suction from separator 72, discharges the cracked gas to cracked gas header 84 or to flare 86. From the cracked gas header, the cracked gas is passed to a fractionation means for recovery of the desired product. The flare is provided as a safety device whereby the cracked gas can at any time be burned in the atmosphere.

A pressure controller recorder 87 connected to line 82 is operatively connected to valve 88 in fuel line 89. When pressure in line 82 falls below a set value, pressure controller recorder 87 operates to open valve 88, which is normally closed, thereby admitting a fuel gas to gas-liquid contact tower 30 through line 89. By operating in this manner, pressure in the quench system is not allowed to fall below a predetermined value.

It will be evident that we have provided an effective system for quenching cracked gases and removing the tar therefrom. While the quench and tar removal system has been described specifically in conjunction with the operation of pebble heater apparatus, it is not intended to so limit the invention and it should be understood that the invention can be utilized with any cracking system.

As will be evident to those skilled in the art, various modifications of this invention can be made or followed in the light of the foregoing disclosure and discussion without departing from the spirit or scope of the disclosure.

We claim:

1. Apparatus for quenching and scrubbing a gas recovered from the thermal conversion of hydrocarbons which comprises, in combination, a gas-liquid contact tower; gas inlet means in the lower part of said tower; gas outlet means in the upper end portion of said tower; heat exchange liquid inlet means in the upper portion of said tower; means for withdrawing tar from the lower end of said tower; gas separation means; gas conduit means for passing gas from said gas outlet means to said gas separation means; means for introducing oil into said gas conduit means; means for withdrawing oil and tar from the lower portion of said gas separation means; gas outlet means in the upper portion of said gas separation means; phase separation means for separating heat exchange liquid, oil and tar; liquid conduit means communicating between the lower portion of said tower and said phase separation means; means for introducing heat exchange liquid into said phase separation means; and means for withdrawing heat exchange liquid, oil, and tar separately from said phase separation means.

2. Apparatus for quenching and scrubbing a gas recovered from the thermal conversion of hydrocarbons which comprises, in combination, a gas-liquid contact tower; a gas inlet in the lower part of said tower; a first gas outlet in the upper end portion of said tower; heat exchange liquid inlet means in the upper portion of said tower; first conduit means attached to the lower end of said tower for tar withdrawal; a steam jacket surrounding said first conduit means, said steam jacket having steam inlet and outlet means connected thereto; a first liquid outlet means in the lower part of said tower; a jacket encompassing the lower end portion of said tower, said jacket having steam inlet and outlet means connected thereto; a gas separation means; second conduit means extending between said first gas outlet and said gas separation means; means for introducing oil into said second conduit means; a second gas outlet in the upper portion of said gas separation means; a second liquid outlet means in the lower portion of said gas separation means; phase separation means for separating heat exchange liquid, oil and tar communicating with said first liquid outlet means; liquid outlet means in the lower portion of said phase separation means for the separate withdrawal of heat exchange liquid, tar, and oil; and heat exchange liquid inlet means in the upper portion of said phase separation means.

3. Apparatus for quenching and scrubbing a gas recovered from the thermal conversion of hydrocarbons which comprises, in combination, a gas-liquid contact tower; first gas inlet means in the lower part of said tower; gas outlet means in the upper end portion of said tower; heat exchange liquid inlet means in the upper portion of said tower; a plurality of baffle members disposed in spaced relation within the upper portion of said tower below said water inlet means and above said first gas inlet means; a second gas inlet means in an intermediate portion of said tower; means for withdrawing tar from the lower end of said tower; gas separation means; first conduit means for passing gas from said gas outlet means to said gas separation means; means for introducing oil into said first conduit means at a point adjacent to said gas separation means; means for withdrawing oil and tar from the lower portion of said gas separation means; gas outlet means in the upper portion of said gas separation means for separating heat exchange liquid, oil and tar; phase separation means comprising a substantially horizontal tank, an oil collecting means disposed within said tank, and having oil withdrawal means connected thereto, tar withdrawal means connected to the bottom of said tank, heat exchange liquid withdrawal means connected to the bottom of said tank, a substantially vertical baffle member attached to the bottom of said tank between said heat exchange liquid withdrawal means and said tar withdrawal means, and heat exchange liquid inlet means in the top part of said tank; and conduit means communicating the lower portion of said tower with said phase separation means.

4. The apparatus of claim 3 in which a recycle line connects the heat exchange liquid withdrawal means of said phase separation means with the heat exchange liquid inlet means in said gas-liquid contact tower.

5. The apparatus of claim 4 in which a liquid level controller associated with said phase separation means is operatively connected to a flow control means in said heat exchange liquid inlet means in the top part of said tank.

6. Apparatus for quenching and scrubbing a gas recovered from the thermal conversion of hydrocarbons which comprises, in combination, a first gas-liquid contact tower; first gas inlet means in the upper portion of said first tower; first heat exchange liquid inlet means in the upper portion of said first tower; first gas outlet means in the lower portion of said first tower; a second gas-liquid contact tower; first conduit means connecting said first gas outlet means with a second gas inlet means in the lower portion of said second tower; second gas outlet means in the upper end portion of said second tower; second heat exchange liquid inlet means in the upper portion of said second tower; means for withdrawing tar from the lower end of said second tower; gas separation means; second conduit means for passing gas from said second gas outlet means to said gas separation means; means for introducing oil into said second conduit means; means for withdrawing oil and tar from the lower portion of said gas separation means; third gas outlet means in the upper portion of said gas separation means; phase separation means for separating heat exchange liquid, oil and tar; third conduit means communicating the lower portion of said second tower with said phase separation means, means for introducing heat exchange liquid into said phase separation means; and means for withdrawing heat exchange liquid, oil, and tar separately from said phase separation means.

7. The apparatus of claim 6 in which the lower portion of said second gas-liquid contact tower is surrounded by a steam jacket having a steam inlet and a steam outlet connected thereto.

8. The apparatus of claim 6 in which a recycle line connects said heat exchange liquid withdrawal means of said phase separation means with said second heat exchange liquid inlet means in said second gas-liquid contact tower and a liquid level controller associated with said phase separation means is operatively connected to said means for introducing heat exchange liquid into said phase separation means.

9. A process for quenching and scrubbing a gas recovered from the thermal conversion of hydrocarbons which comprises passing said gas into a quenching zone; contacting said gas with water in said quenching zone in countercurrent flow; withdrawing cooled, partially tar-free gas overhead from said quenching zone through a gas withdrawal zone; collecting a liquid mixture comprising water, light oil, and tar in the lower end of said quenching zone; heating the lower end of said quenching zone to a temperature sufficiently high to maintain any tar collected therein in a fluid state; withdrawing tar from the lower end of said quenching zone; withdrawing a liquid mixture comprising water, light oil, and tar from the lower portion of said quenching zone; passing said liquid mixture into a liquid separation zone; withdrawing water, light oil, and tar separately from said liquid separation zone; recycling the water withdrawn from said liquid separation zone to said quenching zone; separately contacting the cooled, partially tar-free gas with a predominantly aromatic oil in said gas withdrawal zone; passing said gas and oil from said gas withdrawal zone into a gas separation zone; withdrawing tar and oil from the lower portion of said gas separation zone; and recovering overhead from said gas separation zone purified, tar-free gas.

10. A process for quenching and scrubbing a gas recovered from the thermal conversion of hydrocarbons which comprises passing said gas from a reaction zone into a first quenching zone; contacting said gas with water in said first quenching zone, thereby cooling said gas to a temperature in the rang of 500° F. to 1000° F.; passing said gas with steam and water into the lower portion of a second quenching zone; introducing water into the upper portion of said second quenching zone; contacting said gas with said water in countercurrent flow through said quenching zone; withdrawing partially tar-free gas cooled to a temperature in the range of 100° F. to 150° F. from the upper part of said second quenching zone; collecting a liquid mixture comprising water, light oil, and tar in the lower end of said second quenching zone; heating the lower end of said second quenching zone to a temperature sufficiently high to maintain any tar contained therein in a fluid condition; withdrawing tar from the lower end of said second quenching zone; withdrawing a liquid mixture comprising water, light oil, and tar from the lower part of said second quenching zone; passing said liquid mixture into a liquid separation zone; separating said liquid mixture into layers of water, light oil, and tar within said liquid separation zone; withdrawing tar from said liquid separtion zone; withdrawing light oil from said liquid separation zone; withdrawing water from said liquid separation zone and recycling same to said second quenching zone; introducing a controlled amount of water into said liquid separation zone in order to supply sufficient water to said second quenching zone to effect the cooling of the gas therein; contacting the partially tar-free gas removed overhead from said second quenching zone with a predominantly aromatic oil; passing said gas and aromatic oil into a gas separation zone; withdrawing tar and oil from the lower part of said gas separation zone; and recovering overhead from said gas separation zone purified, tar-free gas.

11. A process for quenching and scrubbing a gas recovered from the thermal conversion of hydrocarbons which comprises passing said gas from a reaction zone into a first quenching zone; contacting said gas with water in said first quenching zone, thereby cooling said gas to a temperature at which it is stable; passing said gas with steam and water into the lower portion of a second quenching zone; introducing water into the upper portion of said second quenching zone; contacting said gas with said water in countercurrent flow through said quenching zone; withdrawing cooled, partially tar-free gas from said second quenching zone; collecting a liquid mixture comprising water, light oil, and tar in the lower end of said second quenching zone; heating the lower end of said second quenching zone to a temperature sufficiently high to maintain any tar contained therein in a fluid condition; withdrawing tar from the lower end of said second quenching zone; withdrawing a liquid mixture comprising water, light oil, and tar from the lower part of said second quenching zone; passing said liquid mixture into a liquid separation zone; separating said liquid mixture into layers of water, light oil, and tar within said liquid separation zone; withdrawing tar from said liquid separation zone; withdrawing light oil from said liquid separation zone; withdrawing water from said liquid separation zone and recycling same to said second quenching zone; introducing a controlled amount of water into said liquid separation zone in order to supply sufficient water to said second quenching zone to effect the cooling of the gas therein; contacting the partially tar-free gas removed overhead from said second quenching zone with a predominantly aromatic oil; passing said gas and aromatic oil into a gas separation zone; withdrawing tar and oil from said gas separation zone; and recovering from said gas separation zone purified, tar-free gas.

References Cited in the file of this patent

UNITED STATES PATENTS

| | | |
|---|---|---|
| 1,487,768 | Torrey | Mar. 25, 1924 |
| 1,830,178 | Sperr | Nov. 3, 1931 |
| 1,905,423 | Rhodes et al. | Apr. 25, 1933 |
| 2,386,390 | Fernelius et al. | Oct. 9, 1945 |
| 2,715,948 | Lewis et al. | Aug. 23, 1955 |
| 2,747,680 | Kilpatrick | May 29, 1956 |
| 2,750,000 | Williams et al. | June 12, 1956 |

U. S. DEPARTMENT OF COMMERCE
PATENT OFFICE

CERTIFICATE OF CORRECTION

Patent No. 2,827,125     Dick S. Hall et al.     March 18, 1958

It is hereby certified that error appears in the printed specification of the above numbered patent requiring correction and that the said Letters Patent should read as corrected below.

Column 6, line 36, strike out "for separating heat exchange liquid, oil and tar" and insert the same after "means" and before "comprising" in line 37, same column.

Signed and sealed this 3rd day of June 1958.

(SEAL)
Attest:
KARL H. AXLINE
Attesting Officer

ROBERT C. WATSON
Commissioner of Patents